United States Patent
Ait Bouziad

(10) Patent No.: US 12,532,983 B2
(45) Date of Patent: Jan. 27, 2026

(54) AUTOMATIC SYSTEM FOR DISPENSING ROASTED COFFEE BEANS

(71) Applicant: SOCIETE DES PRODUITS NESTLE S.A., Vevey (CH)

(72) Inventor: Youcef Ait Bouziad, Echandens (CH)

(73) Assignee: Societe des Produits Nestle S.A., Vevey (CH)

( * ) Notice: Subject to any disclaimer, the term of this patent is extended or adjusted under 35 U.S.C. 154(b) by 1104 days.

(21) Appl. No.: 17/601,492

(22) PCT Filed: Apr. 8, 2020

(86) PCT No.: PCT/EP2020/060005
§ 371 (c)(1),
(2) Date: Oct. 5, 2021

(87) PCT Pub. No.: WO2020/208068
PCT Pub. Date: Oct. 5, 2020

(65) Prior Publication Data
US 2022/0192416 A1   Jun. 23, 2022

(30) Foreign Application Priority Data
Apr. 8, 2019 (EP) .................................. 19167729

(51) Int. Cl.
*A47J 31/40* (2006.01)
*A47J 31/44* (2006.01)

(52) U.S. Cl.
CPC ............... *A47J 31/44* (2013.01); *A47J 31/40* (2013.01)

(58) Field of Classification Search
CPC .. A47J 31/44; A47J 31/40; A47J 31/42; A47J 31/38
See application file for complete search history.

(56) References Cited

U.S. PATENT DOCUMENTS

| 1,936,857 A | * | 11/1933 | Reisdorf | A47J 47/04 |
| | | | | 222/387 |
| 3,804,635 A | * | 4/1974 | Weber | A47J 31/38 |
| | | | | 99/302 R |

(Continued)

FOREIGN PATENT DOCUMENTS

| CN | 102395304 A | 3/2012 |
| CN | 202919936 U | 5/2013 |

(Continued)

OTHER PUBLICATIONS

"The Pros and Cons of Silicone Rubber: Is it the Perfect Material for Your Project?", 2023, https://srm-industries.com/, pp. 3-4 (Year: 2023).*

(Continued)

*Primary Examiner* — Tiffany T Tran
(74) *Attorney, Agent, or Firm* — K&L Gates LLP

(57) ABSTRACT

The invention relates to a system (100) for dispensing a certain quantity of coffee beans into a beverage preparation machine to prepare a coffee beverage, the system comprising a tight variable volume container (20) with a volume receptacle (22) where the coffee beans are stored, the volume receptacle (22) being configured to modify its internal volume in order to adapt it to the quantity of coffee beans stored in it; the system (100) further comprising an active dosing device (30) configured to convey coffee beans with respect to the volume receptacle (22), the dosing device (30) being tight to the outside environment also while conveying coffee beans. The invention further relates to a method for (Continued)

actuating a system (100) for dispensing a certain quantity of coffee beans into a beverage preparation machine to prepare a coffee beverage.

12 Claims, 9 Drawing Sheets

(56) References Cited

U.S. PATENT DOCUMENTS

| | | | | |
|---|---|---|---|---|
| 3,847,304 | A * | 11/1974 | Cohen | B65D 83/766 |
| | | | | 222/326 |
| 2013/0082130 | A1 * | 4/2013 | Hulett | A47J 42/50 |
| | | | | 241/291 |
| 2015/0157166 | A1 * | 6/2015 | Van Os | A47J 42/50 |
| | | | | 99/289 R |
| 2015/0210416 | A1 * | 7/2015 | Duncan | B65C 3/065 |
| | | | | 53/585 |
| 2017/0127884 | A1 * | 5/2017 | Oddera | A47J 42/40 |
| 2018/0271322 | A1 * | 9/2018 | Thai | B01F 35/92 |
| 2019/0307285 | A1 * | 10/2019 | Fain | A47J 31/007 |
| 2021/0219770 | A1 * | 7/2021 | Deuber | A47J 31/42 |

FOREIGN PATENT DOCUMENTS

| | | |
|---|---|---|
| JP | 2015027536 A | 2/2015 |
| RU | 2576608 C2 | 3/2016 |
| WO | 2006120560 | 11/2006 |
| WO | 2010064902 | 6/2010 |
| WO | 2015095877 | 6/2015 |
| WO | WO-2015095877 A2 * | 6/2015 ............... A23F 5/08 |
| WO | 2017178393 A1 | 10/2017 |

OTHER PUBLICATIONS

Japanese Office Action for Appl No. 2021-559663 dated Jan. 9, 2024.
Russian Office Action for Appl No. 2021131766/03 dated Jul. 18, 2023.
Chinese Office Action for Appl No. 202080027431.0 dated Jan. 1, 2024, 7 pages.

* cited by examiner

AUTOMATIC SYSTEM FOR DISPENSING ROASTED COFFEE BEANS

CROSS REFERENCE TO RELATED APPLICATIONS

The present application is a National Stage of International Application No. PCT/EP2020/060005, filed on Apr. 8, 2020, which claims priority to European Patent Application No. 19167729.3, filed on Apr. 8, 2019, the entire contents of which are being incorporated herein by reference.

FIELD OF THE INVENTION

The present invention is directed to an automatic system able to dispense a certain quantity of roasted coffee beans into a full automatic machine, where the beans will be grinded and then a coffee beverage will be extracted and dispensed. The invention further relates to a method of actuating such a system.

BACKGROUND OF THE INVENTION

At present, full automatic machines, processing roasted coffee beans into a coffee beverage delivered to cup are evolving more and more, from a technical point of view. In these machines, the grinding technology (to produce the roasted and ground coffee from the initial roasted coffee beans) and the extraction control (when extracting the coffee beverage) are highly optimized. However, coffee freshness remains a key control parameter influencing the quality of the coffee beverage prepared.

During the storage and transport outside of the production factory, roasted coffee beans are stored in a sealed airtight packaging container comprising a degassing valve allowing the coffee to degas during its shelf life, but without allowing any air to enter into the packaging container, thus preventing oxidation of the roasted coffee beans.

Once this sealed airtight packaging container is opened, typically to feed roasted coffee beans into a full automatic machine, these roasted coffee beans are often stored in a non-tight canister at the upper part of the machine, for a continuous feeding of the machine for the preparation of coffee beverages (typically feeding the beans grinder). This kind of storage method puts the coffee beans in direct and continuous contact with air, thus with oxygen, and coffee, as a natural product, is subject to aging, and particularly to oxidation.

The taste of oxidized coffee can be easily detected by the consumer: as an example, and according to a sensory internal study, this oxidized taste can be detected when 80 micrograms of oxygen ($O_2$) are absorbed by 1 gram of coffee, which leads in terms of volumes ratio to 3% of oxygen/coffee or 15% of air/coffee. According to the Coffee Freshness handbook, first edition, published by the Specialty Coffee Association, in packaged coffee, oxygen even at very low levels (less than 2%) has been found to migrate into coffee and facilitate oxidation reactions. Moreover, research shows that certain types of aroma compounds in coffee begin to dissipate almost immediately after grinding, and the greatest rate of chemical freshness loss occurs in the first month of coffee storage, which may vary depending on the coffee blend, roast-degree or extraction technique. Carbon dioxide also affects extraction: espresso extraction parameters need to be adjusted in order to take into account how fresh the coffee is, as this increases the resistance to the water flow and affects the contact between the extraction water and coffee.

Roasted coffee beans, even if not as sensitive as grinded coffee (as they represent lower surface/volume ratio), when opened from the airtight packaging containers used for their transport, and are stored in classical bean hoppers/canisters on the upper part of the machines, are in continuous contact with air, making the coffee beans lose their freshness, so an oxidation taste (oxidation off notes) can be sensed after just few days, typically after three days at ambient conditions. Moreover, this phenomenon is accentuated and occurs sooner in full automatic coffee machines as the bean canisters (hoppers) are typically arranged at the upper part of these machines, and are thus subjected to higher temperatures caused by the location of the heating elements of the machine. Theoretically, according to Arrhenius equation, chemical reaction kinetics are twice as fast by each 10 degrees (° C.) of temperature increase.

Coffee manufacturers have proposed different solutions for a better preservation of the roasted coffee beans. For example, EP 2848168 A1 is known in the state of the art, where a method for preparing espresso coffee starting from roasted coffee beans is disclosed: coffee beans are inserted in a containment tank where vacuum is created so the beans are better preserved. Then, a pre-established amount of coffee beans is transferred from the containment tank to a dosing chamber and into a grinding station, where the portion of coffee beans reaching the grinding station will be grinded. Document US20160374361 A1 discloses an airtight container assembly with pressurized inert gas or $CO_2$ for long term preservation of the freshness of roasted coffee beans as to aroma and taste, so low residual oxygen and moisture concentrations within the airtight container assembly are reached, and the coffee is well preserved for a long time. Document WO 2013/167958 A1 discloses a container where coffee beans can be stored, where the inner volume is filled with inert, pressurized gas, in order to maintain freshness of the coffee beans for a long term.

However, these known systems present a number of disadvantages:
  vacuum and pressurized inert gas atmospheres are expensive and require appropriate management;
  when using vacuum, the coffee volatiles are removed at each time, so even if the coffee oxidation is retarded or limited, the coffee will lose many aromas with the vacuum preservation process;
  these systems do not have any controlled dosing system to serve the only required quantity, freshly preserved; known systems use time or volumetric dosing for delivering the roast and ground coffee to prepare a beverage, thus not being possible to detect any change in product density or drift from one beverage to the other, resulting in a low repeatability in cup and in discrepancies for the final consumer.

The present invention aims at overcoming the limitations and problems mentioned in the existing automatic systems, proposing a simple and cheap solution to preserve and dose coffee beans from a container into full automatic machines. The invention also aims at other objects and particularly the solution of other problems as will appear in the rest of the present description.

OBJECT AND SUMMARY OF THE INVENTION

According to a first aspect, the invention refers to system for dispensing a certain quantity of coffee beans into a beverage preparation machine to prepare a coffee beverage: the system comprises a tight variable volume container with a volume receptacle where the coffee beans are stored, the volume receptacle being configured to modify its internal volume in order to adapt it to the quantity of coffee beans stored in it. The system further comprises an active dosing device configured to convey coffee beans with respect to the volume receptacle, the dosing device being tight to the outside environment also while conveying coffee beans.

The dosing device in the system of the invention is configured to act as a pump or as a reverse pump in order to convey coffee beans out of the volume receptacle or inside of the volume receptacle (22), respectively. Typically, the dosing device in contact with the coffee beans is made of a compressible material having a hardness that is lower than the hardness of the coffee beans.

Typically, in the system of the invention, the variable volume container comprises a piston element displacing by gravity inside the volume receptacle to adapt the internal volume of this receptacle to the quantity of coffee beans stored in it.

Preferably, the piston element further comprises a pressure valve with a threshold pressure equivalent to the weight of the piston element. The piston element typically closes the volume receptacle in a tight manner, as a lid.

In the system of the invention, the volume receptacle is preferably configured by a tight flexible container able to shrink and reduce its volume in order to adapt it to the volume of the remaining coffee beans in it.

In a preferred embodiment of the system of the invention, the dosing device comprises two counter-rotating cylinders tightly contacting each other while they deliver the coffee beans. Typically, the dosing device comprises a pair of intermeshing gears for conveying the coffee beans out of and into the volume receptacle.

Preferably, the system further comprises a weighing device arranged at the exit of the dosing device to weigh the beans dispensed. The weighing device typically controls the operation of the dosing device and so of the quantity of coffee beans dispensed.

In an embodiment of the invention, the system further comprises a control unit managing the operation of the dosing device as a function of the type of coffee beans and/or of the coffee beverage to prepare. In another embodiment, the system further comprises a control unit managing the operation of the dosing device and of the weighing device as a function of the type of coffee beans and/or of the coffee beverage to prepare. Preferably, the control unit further comprises means to monitor the torque exerted by the dosing device.

In a yet preferred embodiment of the invention, the system further comprises a grinder receiving the beans dispensed by the system and converting them into roast and ground coffee.

According to a second aspect, the invention relates to a method for actuating a system for dispensing a certain quantity of coffee beans into a beverage preparation machine to prepare a coffee beverage as the one described, the method comprising the following steps:
the system needs to dispense a certain quantity of coffee beans to prepare a certain coffee beverage in a beverage preparation machine;
depending on the coffee beverage to be prepared and/or on the characteristics of coffee beans dispensed, the dosing device functions during a certain time in order to deliver the quantity required;
the variable volume container modifies the internal volume of the volume receptacle in order to adapt it to the quantity of coffee beans stored, preventing any air replacement into the volume receptacle.

In the method of the invention, the control unit typically manages the operation of the dosing device and, optionally, of the weighing device, as a function of the type of coffee beans and/or of the coffee beverage to prepare.

Preferably, in the method of the invention, the control unit is connected to a grinder in the beverage preparation machine or in the system, such that the control unit provides the grinder with the grinding parameters for the coffee beans dispensed, as a function of the coffee beverage to be prepared and/or of the characteristics of coffee beans dispensed.

Typically, in the method according to the invention, the control unit receives from an interface or HMI the information on the coffee beverage to be prepared, and then connects to a database to retrieve the information on the quantity of coffee beans needed and the grinding parameters to command the dosing device and the grinder, accordingly.

According to another embodiment, in the method of the invention, the user provides the control unit with the information on the quantity of coffee beans and/or with the grinding parameters to command the dosing device and the grinder, accordingly.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

Figure 1A:
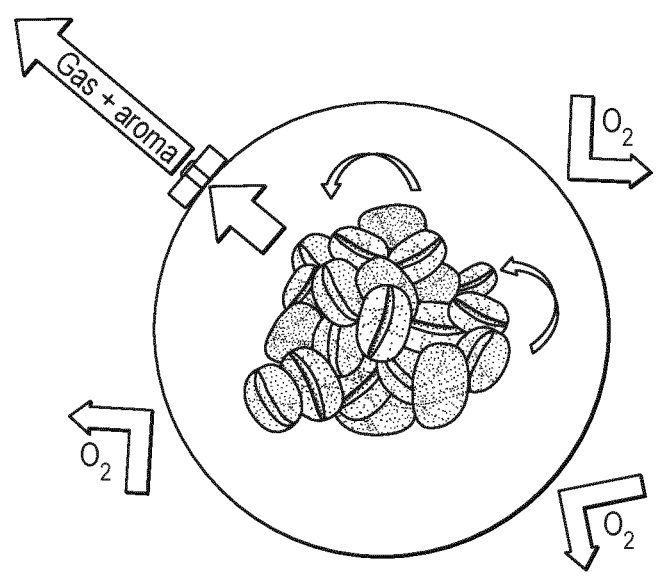
FIGS. 1a-b show, respectively, and according to the known prior art, coffee beans comprised inside a pouch made of a barrier material against air and particularly against oxygen and the coffee beans once the pouch is open after having stored the beans for several weeks or a few months so they come into contact with oxygen and therefore go through an oxidation process.

The present invention is directed to an automatic system 100 able to dispense a certain quantity of roasted coffee beans into a full automatic machine, where the beans will be first grinded and then extracted into a coffee beverage. The system 100 of the invention comprises a variable volume container 20 and a dosing device 30. The system typically also comprises a control unit 50 and, optionally, a weighing device 40. The system of the invention works as a tight system, maintaining the roasted coffee beans in an airtight environment during the delivery.

The container 20 in the system 100 of the invention is a variable volume comprising a volume receptacle 22 where the coffee beans are stored: this volume receptacle 22 is configured to modify its inner volume in such a way that it adapts to the quantity of coffee beans that are stored inside of it. Different possibilities are available for the configuration of such variable volume container 20 and volume receptacle 22. According to a preferred embodiment of the invention, the container 20 comprises a piston element 21 which acts as a passive element and moves by gravity as coffee beans are dispensed to the dosing device 30: as these beans are dispensed, the piston element 21 moves passively downwards in order to remove the headspace occupied by air and left by the delivered beans, thus adapting its volume to that occupied by the remaining beans inside of it. The piston element 21 moves downwards by its own weight to compensate the volume loss left by the coffee beans (volume decrease as these beans have been delivered through the dosing device 30). The container 20 comprises a volume receptacle 22 where the coffee beans are stored and where the piston element 21 moves. Furthermore, the piston element 21 comprises a joint 23 arranged between the piston 21 and the inner walls of the receptacle 22, when the piston 21 moves downwards, in order to minimize and avoid as much as possible the gas exchange (typically air) between the volume of coffee beans and the outer atmosphere, so the beans are preserved from oxygen as far as possible. In order to introduce in an easy way the coffee beans into the volume receptacle 22, the piston element 21 is provided with an upper handle 24 so it can be removed from the receptacle 22 and the beans can be added into this volume.

According to another possible embodiment, the variable volume container 20 may comprise a volume receptacle 22 configured as a sachet or pouch, made of a flexible material, and shrinking to adapt its volume to the remaining volume occupied by the remaining coffee beans. As the flexible pouch will be made tight to air, when coffee beans are dispensed from it, air is sucked from the inside of its volume and so the flexible material will adapt to the remaining occupied volume. This execution is not however represented in the Figures, though it is evident for a person skilled in the art.

The piston element 21 can also comprise a pressure valve 26, which is a threshold degassing valve equivalent to the weight of the piston element. This pressure valve 26 works when the volume receptacle 22 is going to be filled with beans, as exemplified by FIGS. 5a-d, and can also work when the coffee beans degass. When the volume receptacle 22 is going to be filled with coffee beans, there is air remaining in the headspace of the inner volume, as shown in FIG. 5b: the piston element 21 descends with the pressure valve 26 open, and so any remaining air inside the receptacle 22 is evacuated, as represented in FIG. 5c. Tightness in the volume receptacle 22 is maintained while the dispensing of the coffee beans takes place, as per FIG. 5d. Therefore, when the variable volume container 20 is going to be filled with beans in order to be stored before use (see FIGS. 5a-d), this pressure valve 26 allows that the air inside the volume receptacle 22 escapes so the beans are stored in a tight atmosphere, preventing oxidation.

In normal conditions, the valve 26 in the piston element 21 is closed and maintains the inner pressure inside the volume receptacle 22; when the roasted coffee beans start degassing and the inner pressure in the receptacle 22 becomes higher than the weight of the piston element 21, the valve 26 opens to release the pressure inside and to avoid that the piston element 21 moves upwards in the case the inner pressure becomes higher than the weight of the piston element. With this threshold pressure setting, it is ensured that no headspace or a minimum headspace exists in the volume receptacle 22, so the coffee beans are isolated from the outer atmosphere (oxygen) as far as possible, and it is thus avoided that the piston element 21 (acting as a lid) moves upwards in the case of the beans quantity inside the receptacle 22 decreasing.

The volume receptacle 22 is preferably formed having a constant section in the vertical axis (Z axis), and is made of a material which is tight to moisture and air. The piston element 21 acts as a lid closing in a tight manner the upper part of the receptacle 22 and moving downwards by its gravity (weight) to replace the volume of the quantity of beans delivered: the piston element 21 will have the same section as that of the volume receptacle 22.

On the bottom part of the container 20, a controlled dosing device 30 is arranged: the coffee beans from the container 20 are gently dosed (i.e. without being subjected to any damage) optionally into a weighing device 40, or directly into the grinder 60 of the full automatic machine. Preferably, the grinder 60 will belong to the full automatic machine, but it can also be made as part of the system 100.

According to a preferred embodiment of the invention, the dosing device 30 comprises two counter-rotating cylinders 31, 32: these cylinders can rotate towards the inner center so they act as a pump to bring the coffee beans from the receptacle 22 into the weighing device 40 or into the grinder 60. Also, the cylinders 31, 32 can rotate towards their exterior (so, towards outside of their center) in order to push remaining beans in the dosing device back into the volume receptacle 22. This is done because it is desired that there are no beans remaining between the cylinders (thus, no beans remaining inside the dosing device 30 once the dosing has been stopped) and also, because the dosing device is made of compressible material and the cylinders are tightly closing between them, if beans stay there during long periods, these cylinders may get deformed and not be tight any longer. Therefore, the reverse pumping rotation to put beans back into the volume receptacle 22 takes place for these reasons, and the dosing device 30 shall be correctly configured for this.

Typically, the cylinders 31 and 32 have a layer of compressible material (silicon, foam or similar) in order not to damage the coffee beans when they are dispensed and also in order to maintain a tight outlet during the serving. The compressible material of the cylinders 31, 32 has a hardness which is lower than the hardness of the coffee beans to be dispensed. The dosing device 30 is also designed in a tight manner such that the roasted coffee beans from the receptacle 22 can be delivered maintaining the air tightness in the said volume 22: as the cylinders 31, 32 are made of a compressible material pressing the beans in order to transport them through this device 30 and into the weighing device 40 or directly into the grinder 60, the tightness of the volume receptacle 22 is therefore preserved. Moreover, as already described, the integrity of the beans is also maintained thanks to these cylinders 31, 32 being made of a soft material.

Figure 4A:
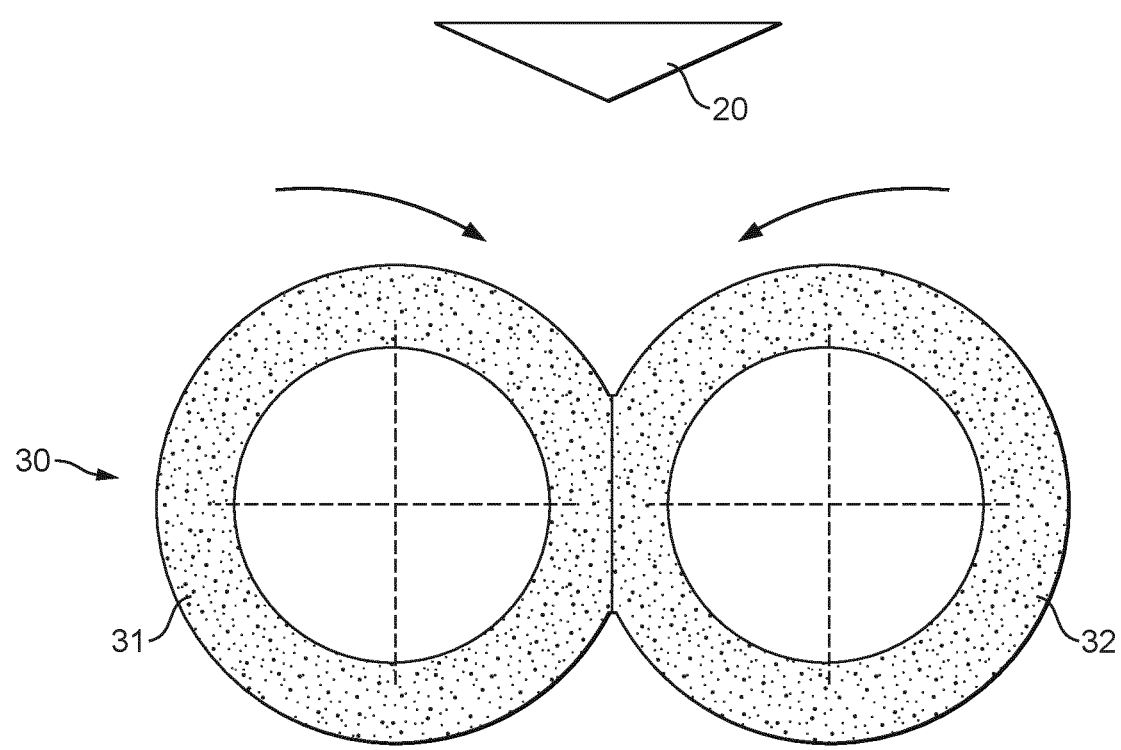
FIGS. 4a-c show the schematic configuration of the dosing device, comprising the cylinders rotating in opposite directions, according to an embodiment of an automatic system for dispensing roasted coffee beans according to the present invention.
Figure 4B:
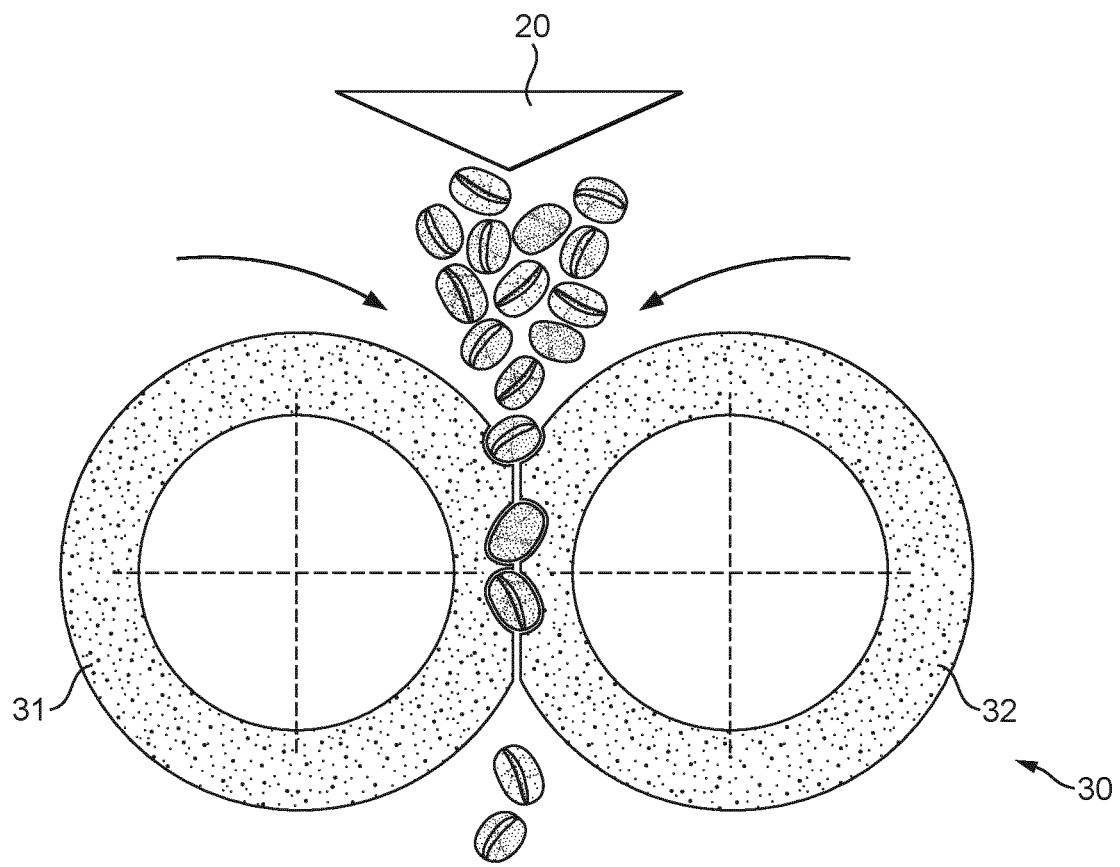
Figure 4C:
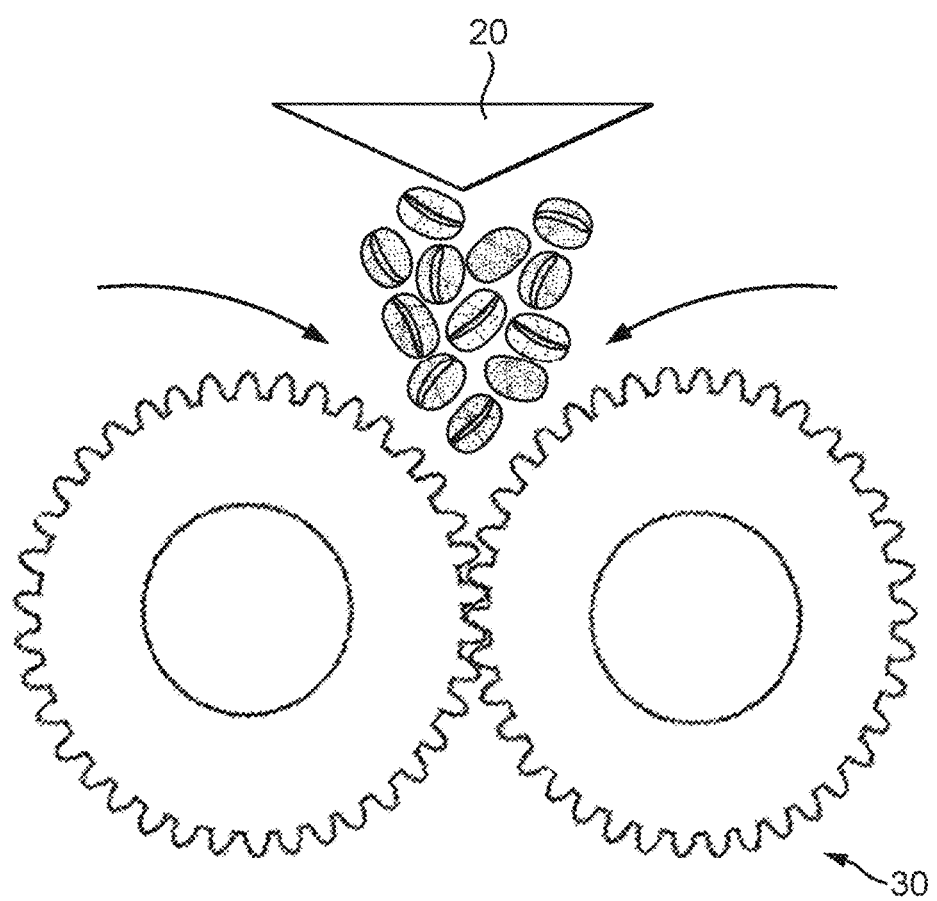

Another possibility is that the dosing device 30 is configured comprising a pair of intermeshing gears 30' for conveying the coffee beans out of and into the volume receptacle 22: these intermeshing gears 30' can be of the known type in the state of the art (see FIG. 4C). Another option would be that the dosing device 30 would only comprise one gear, and additional means to make the dosing device 30 tight.

Typically, when the cylinders 31, 32 of the dosing device 30 rotate in order to move the coffee beans from out of the volume receptacle 22, at the beginning of the dispensing, these cylinders rotate more quickly. However, when the dispensing process is being finalized, the rotation of these cylinders is much slower in order to allow the required precision for the correct dosage of the coffee beans (so the correct amount/quantity of beans is dispensed). When the dosing device 30 comprises gears, the same explanation applies.

The system of the invention can also optionally comprise a weighing device 40 arranged after the dosing device 30: according to the invention, the dosing device 30 acts as a slave while the weighing device 40 acts as a master, thus controlling the operation of the dosing device 30. Therefore, the rotation (on/off) and speed of the cylinders 31, 32 (in fact of the motor driving these cylinders) is controlled by the weighing device 40. This control is done by means of the control unit 50, receiving the information from the weighing device 40 and managing the operation of the dosing device 30. Typically, when a certain dose of coffee is ordered to the system 100 of the invention, the control unit 50 commands the dosing device 30 (the cylinders 31, 32) to start turning and the weighing device 40 starts to weigh the quantity dosed. The weight of the dosed quantity is communicated to the control unit, which compares it to the final weight that needs to be delivered. When the weight of the dose starts to be close to the needed final weight, the control unit 50 commands the motor to reduce its speed in order to achive a higher and additional precision. Finally, when the needed weight has been achieved, the control unit 50 commands the dosing device 30 to stop rotating, so the dosing is stopped. During all this process, the piston element 21 moves passively by gravity and replaces the lost volume, i.e. the volume of the beans dosed to the weighing device 40. When the dosing device 30 comprises gears, a similar explanation would apply.

The dosing by weight is used in the system of the invention because the roasted coffee beans to be delivered have different densities: coffee beans of different origins have different shapes and sizes (typically Robusta vs. Arabica, for example). Density also varies with roasting, typically between 450 g/l to 350 g/l from light roast to dark roast, whereas green coffee is about 800 g/l, and also the weight of the coffee bed to be extracted has an important influence on the coffee beverage for same quantity of water used. Thus, it is very important in order to have a consistent beverage dispensing, to deliver the precise weight amount needed.

The system 100 is further provided, as already described, with a control unit 50, managing the operation process, as it will be further explained. The control unit manages, in the system of the invention, the information on the requested dose of beans to be delivered, the weight of the quantity of beans delivered and the operation of the dosing device 30. Preferably, the control unit 50 is further provided with means monitoring the torque of the dosing device 30, so when no torque or a very low one is detected, this will mean that the receptacle 22 is empty and that there are no beans passing through the cylinders 31, 32 any longer: in this case, a warn signal is triggered by the control unit 50, and the system can then alert the user on the emptiness of the receptacle 22. The dosing device 30 is completely removable from the system 100, in order to be cleaned or to be exchanged, as different dosing devices may be used for different types of roasted beans.

Figure 1B:
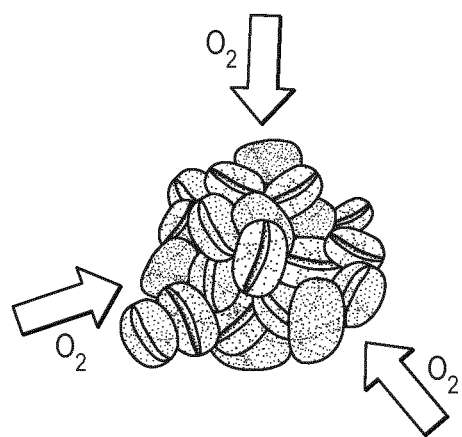

FIG. 1a shows coffee beans comprised inside a known pouch made of a barrier material against air and particularly against oxygen. The pouch is typically arranged comprising a degassing valve allowing the beans to degas during their shelf life, but without allowing any air to enter the pouch, thus preventing oxidation of the roasted coffee beans and preserving their aroma, but subjected to internal ageing. Once the pouch is open, as represented in FIG. 1b, after having stored the beans for several weeks or a few months, the roasted coffee beans come into contact with oxygen and therefore go through an oxidation process, easily detectable by the consumer after a few days. This is the typical situation of the containers with roasted coffee beans dispensed into a canister feeding known full automatic machines.

Figure 2:
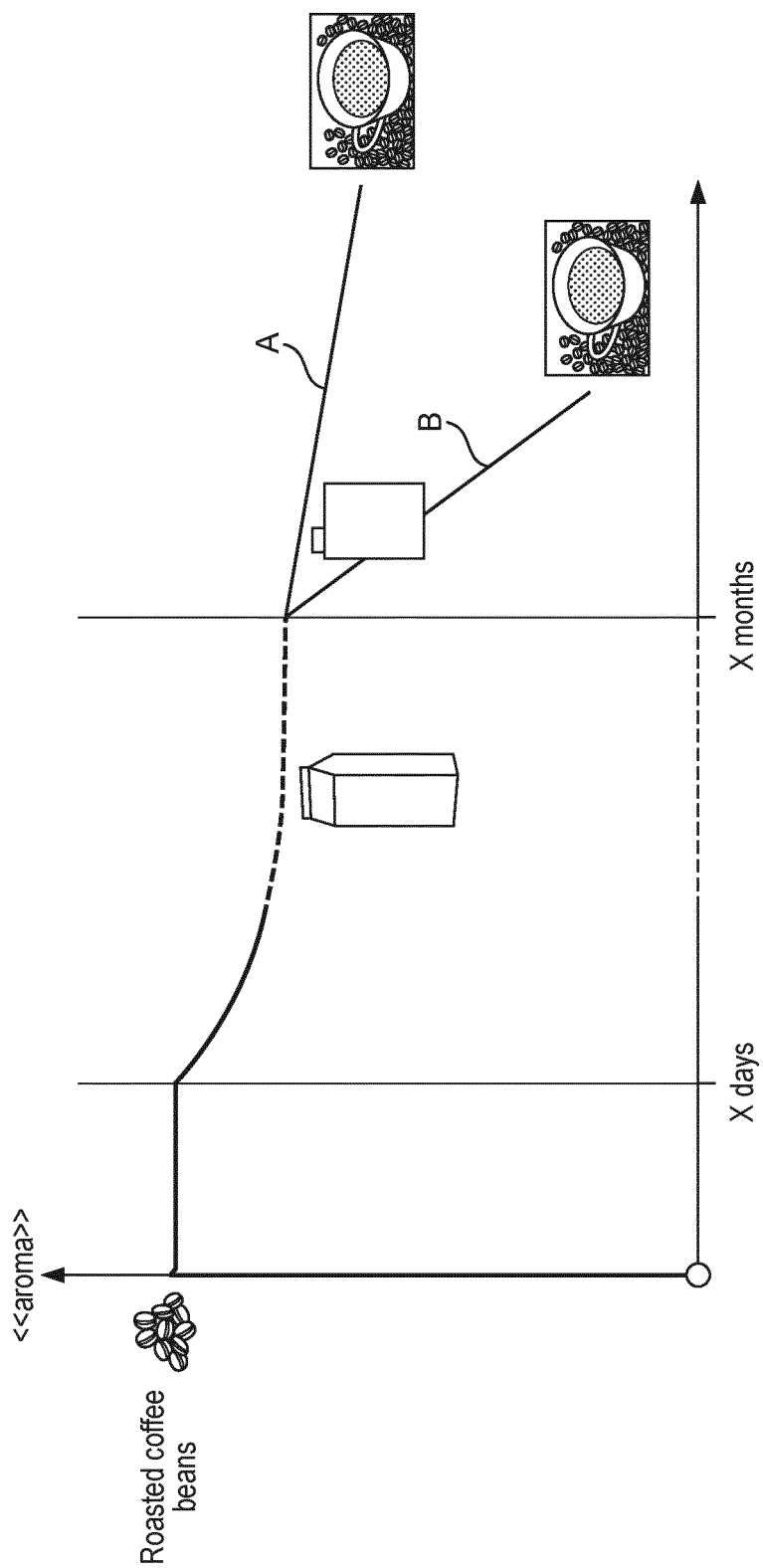
FIG. 2 shows the oxidation and loss of properties with time for roasted coffee beans stored in a barrier pouch, and after the pouch is opened and the beans are dispensed into a canister or feeder of a full-automatic machine (curve B) and the oxidation of coffee beans for the automatic system for dispensing roasted coffee beans according to the present invention.

FIG. 2 shows the oxidation and loss of properties with time for roasted coffee beans stored in a barrier pouch, and after the pouch is opened and the beans are dispensed into a canister or feeder of a full-automatic machine. The curve B represents this oxidation for standard full-automatic machines known in the state of the art. The curve A shows the oxidation for the automatic system for dispensing roasted coffee beans according to the present invention. As it can be seen in the representation of FIG. 2, once in the machine canister or container, the beans in a standard full automatic machine degrade much faster than the beans in a container 20 in a system 100 according to the present invention.

Figure 3:
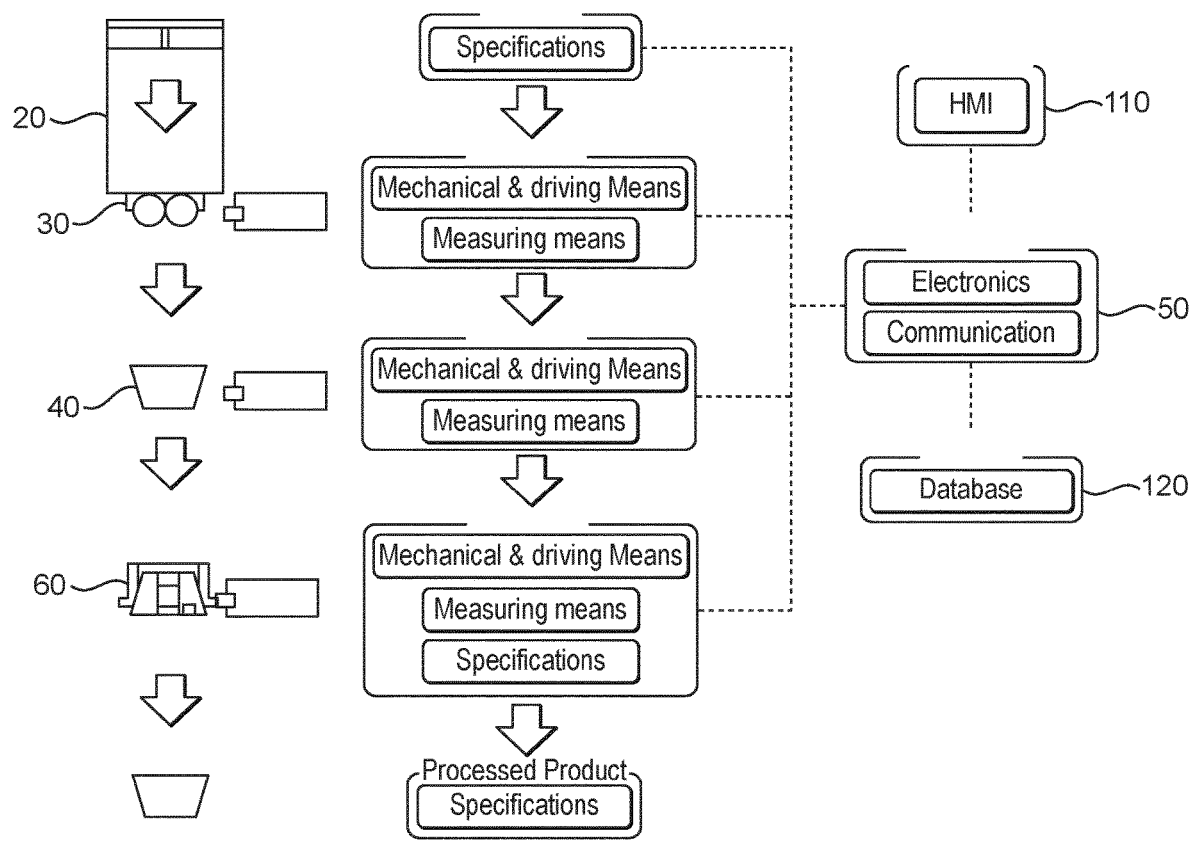
FIG. 3 shows schematically the method for operating an automatic system for dispensing roasted coffee beans according to the present invention.

FIG. 3 shows schematically the method for operating an automatic system 100 for dispensing roasted coffee beans according to the present invention. Depending on the type of coffee (origin and roasting level of the beans) and the date these beans have been roasted and packed, their physical characteristics and constitution vary. The dosing device 30 rotates at a certain speed and during a certain pre-defined time depending on the characteristics of these beans: the torque sensed by this dosing device 30 controls that there are still beans passing through the cylinders 31, 32 (or through the gears, when the dosing device comprises gears instead), i.e. controlling that the receptacle 22 is not empty. The weighing device 40 weighs the amount of beans dispensed, and controls that the amount corresponds to the defined desired amount. Once the needed amount has been delivered, it is sent to the grinder 60, where the beans will be transformed into roast and ground coffee, from where the coffee beverage will be freshly extracted in an appropriate full-automatic machine. As represented in FIG. 3, the control unit 50 will receive input from the system interface 110: this is the HMI with the information on the type of beverage to be prepared, so it determines the type and quantity of roast and ground coffee that has to be provided to the full-automatic machine. The HMI can also provide the control unit with the information on the quantity of coffee beans to be removed from the container 20 and provided to the grinder 60, and can also provide the control unit with the information on the grinding specifications (typically, with the coarseness required for the roast and ground coffee). With these parameters or specifications from the interface 110, the control unit 50 will manage the system 100 accordingly (thus controlling the rotation speed and time of the dosing device 30, the weight required of the delivered beans in the weighing device 40, and the size of the roast and ground coffee that should be dispensed by the grinder 60). To be noted that, when the system 100 does not comprise any weighing device 40, the amount of beans dispensed will be set by the rotation speed of the dosing device 30 and the time the device 30 rotates. The control unit 50 in the system 100 of the invention can also receive the input on recipes specifications for the beverage to be prepared from a database 120, where the above values will be specified.

FIGS. 4a-b show the schematic configuration of the dosing device 30, comprising the cylinders 31, 32 made of a soft material (softer than the beans entrained by them) rotating in opposite directions.

Figure 5D:
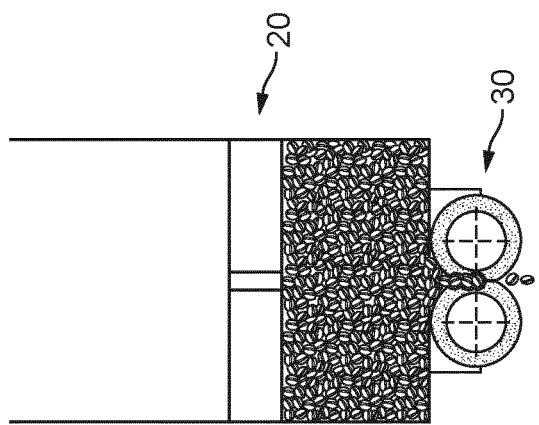
FIGS. 5a-d show the filling of a variable volume container with a piston element and a pressure valve according to a possible embodiment of an automatic system for dispensing roasted coffee beans according to the present invention.
Figure 5C:
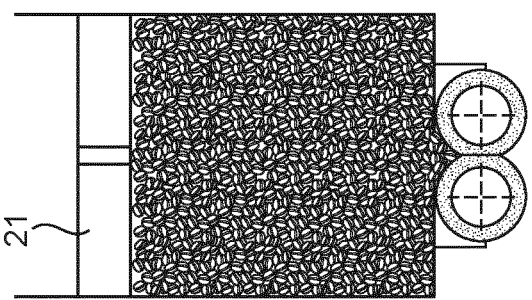
Figure 5B:
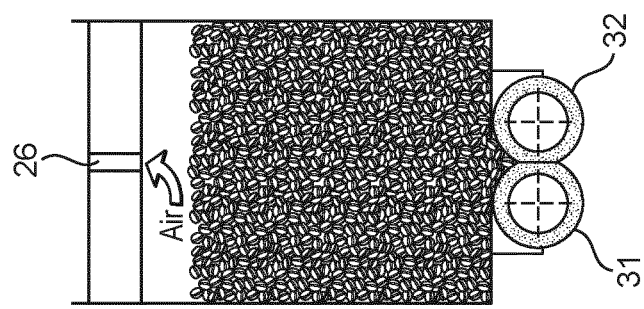
Figure 5A:
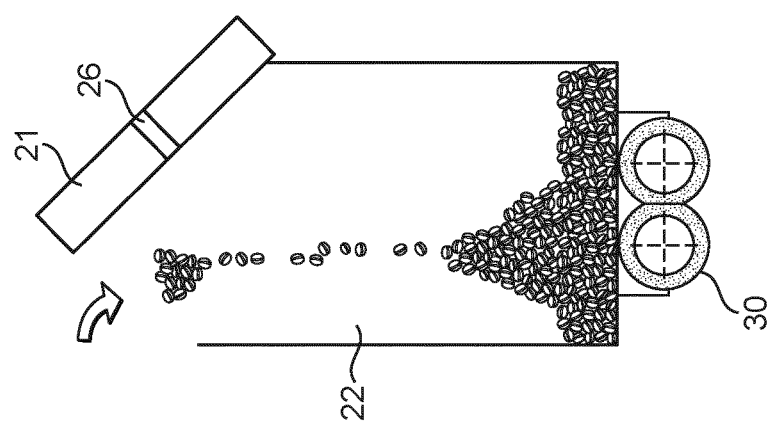

FIGS. 5a-d show the filling of a variable volume container 20 in the system of the invention with roasted coffee beans. The piston element 21 closing the volume receptacle 22 comprises a pressure valve 26, as represented in these Figures. FIG. 5a shows the filling of the roasted beans inside the volume receptacle 22, and FIG. 5b shows the piston element 21 in its position closing this volume: the excess of air inside the receptacle is removed through the pressure valve 26, and when the coffee beans degas, the air produced is also removed via this valve 26, to a stable rest position as shown in FIG. 5c. FIG. 5d shows the position after a certain quantity of coffee beans have been removed from this receptacle and have been provided through the dosing device 30 to the weighing device or directly to the grinder 60.

Figure 6:
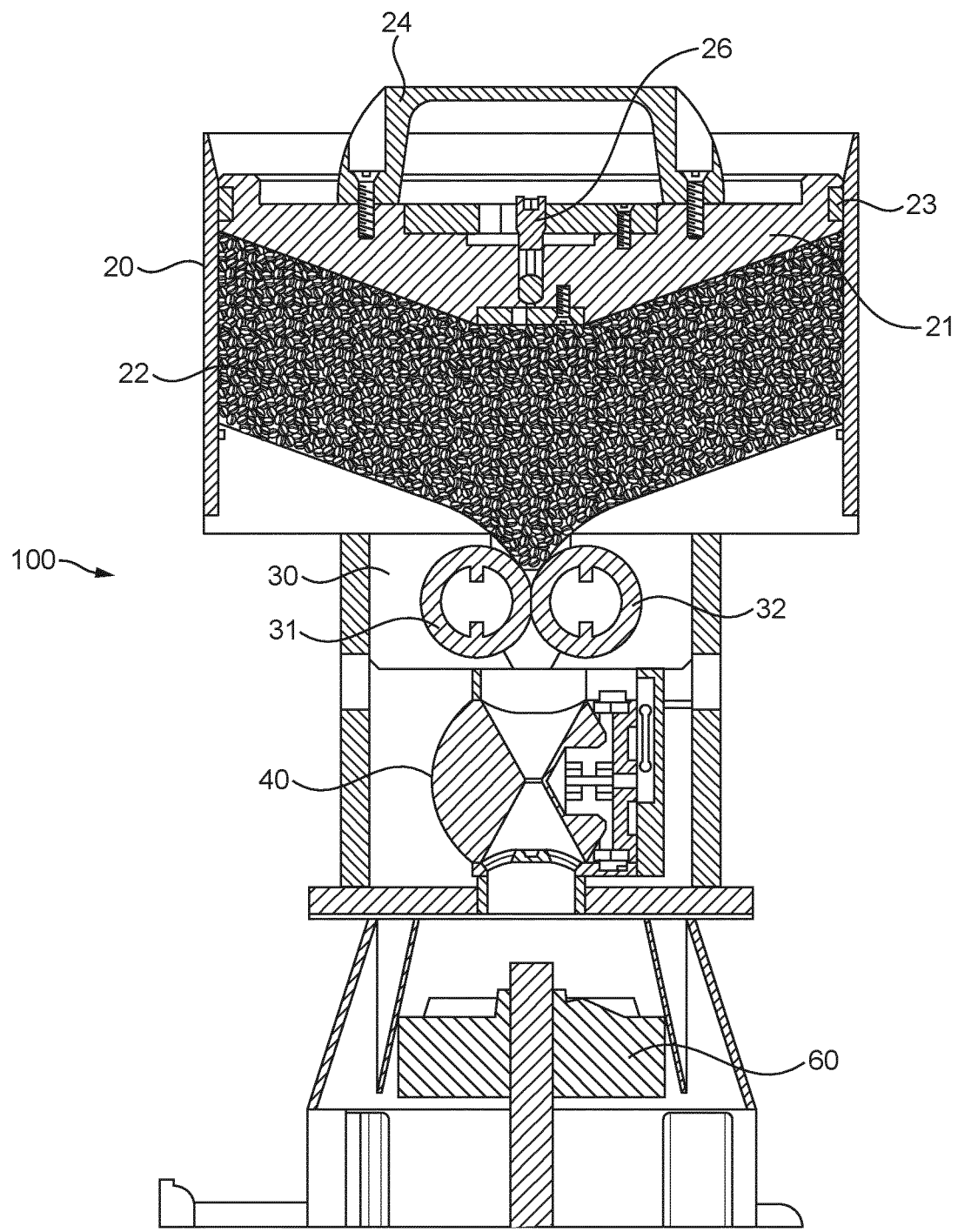
FIG. 6 shows the automatic system able to dispense a certain quantity of roasted coffee beans into a full automatic machine according to a preferred embodiment of the invention, together with its main components.

FIG. 6 shows the automatic system 100 able to dispense a certain quantity of roasted coffee beans into a full automatic machine according to the invention, together with its main components. The variable volume container 20 is closed by a piston element 21 typically comprising a handle 24 and a pressure valve 26 for evacuating air from inside the volume. The piston element 21 moves vertically downwards inside the walls of the volume receptacle 22 with a piston joint 23 tightly closing the gaps between the inner walls of the receptacle and the piston element. The essential elements of the system 100 of the invention comprise the variable volume container 20 and the dosing device 30. Optionally, a weighing device 40 is provided at the exit of the dosing device 30, feeding the grinder 60 in a full-automatic machine.

According to a second object, the invention relates to a method of actuating an automatic system 100 as the one described. The method of the invention comprises the following steps:
  roasted coffee beans are arranged in a container 20, with no headspace as the piston element 21 closes the volume on the upper side of the container 20;
  a certain amount of roasted beans is demanded by the control unit 50 in order to provide it to a full-automatic machine to prepare a coffee beverage, for example;
  once this happens, the dosing device 30 (in particular the cylinders 31, 32 or the gears) starts rotating in order to dispense the required amount: depending on the characteristics of the coffee beans (roasting degree, size, type of beans, coarseness, etc.), a certain number of rotations will be done by the cylinders 31, 32 so as to provide the required amount;
  optionally, when the system 100 also comprises a weighing device 40, the dispensed amount of coffee beans will be weighed, the value of which will be sent to the control unit 50, and the control unit 50 will control the rotation of the dosing device 30 or will command its stop once the required amount of roasted beans has been delivered;
  the piston element 21 will move and descend in the container 20 in order to remove any air in the volume through the pressure valve 26 and keep the beans in a tight atmosphere, preventing their oxidation, therefore adapting the inner volume of the receptacle 22 to the remaining volume occupied by the remaining coffee beans in such receptacle 22;
  the amount of beans will go into the grinder 60 in a full-automatic machine and typically, the control unit 50 will also be connected to the grinder 60: the grinding parameters will therefore be specified by the control unit 50 to this grinder 60 as a function of the type of beans provided and of the type of coffee beverage to be prepared in the full-automatic machine.

In the method of the invention, the control unit 50 can receive for example from the user via an interface or HMI the information on the type of beverage to be prepared in the machine: typically, the control unit will then connect to a database to retrieve the information on the quantity of coffee beans needed and the grinding parameters, in order to properly command the dosing device 30, the weighing device 40 (if any) and the grinder 60 in the full-automatic machine. Another possibility is that the user provides the control unit 50 with the information on the coffee quantity (beans) and/or on the grinding parameters: in this case, the control unit 50 will directly control the dosing device 30, the weighing device 40 (if any) and the grinder 60.

Although the present invention has been described with reference to preferred embodiments thereof, many modifications and alternations may be made by a person having ordinary skill in the art without departing from the scope of this invention, which is defined by the appended claims.

The invention claimed is:

1. A system for dispensing a certain quantity of coffee beans into a beverage preparation machine to prepare a coffee beverage,
  the system comprising an airtight variable volume container with an inner volume configured to store the coffee beans, the inner volume being configured to adapt to a quantity of the coffee beans stored in the airtight variable volume container; and
  the system further comprising an active dosing device configured to act as a pump and as a reverse pump to convey the coffee beans out of or into with respect to the inner volume, respectively, the active dosing device being airtight to an outside environment also while conveying the coffee beans,
  wherein the active dosing device in contact with the coffee beans is made of a compressible material having a hardness that is lower than the hardness of the coffee beans
  wherein the active dosing device comprises two counter-rotating cylinders tightly contacting each other while delivering the coffee beans such that air tightness in the inner volume is maintained,
  the active dosing device configured to rotate towards an inner center of the counter-rotating cylinders so that the active dosing device acts as a pump to convey the coffee beans out of the inner volume; and the active dosing device configured to rotate towards outside of the inner center of the counter-rotating cylinders so that the active dosing device acts as the reverse pump to convey the coffee beans into the inner volume.

2. The system according to claim 1, wherein the airtight variable volume container comprises a piston element displacing by gravity to adapt the inner volume of the airtight variable volume container to the quantity of the coffee beans stored in the inner volume.

3. The system according to claim 2, wherein the piston element closes the inner volume in an airtight manner as a lid.

4. The system according to claim 1, wherein the inner volume is configured by the airtight variable volume container to shrink and reduce in order to adapt to a volume of the coffee beans in the inner volume.

5. The system according to claim 1, wherein the two counter-rotating cylinders comprise a pair of intermeshing gears for conveying the coffee beans out of and into the inner volume.

6. The system according to claim 1 further comprising a weighing device arranged at an exit of the active dosing device to weigh the coffee beans dispensed.

7. The system according to claim 6, wherein the weighing device controls an operation of the active dosing device and of a quantity of the coffee beans dispensed.

8. The system according to claim 6 further comprising a control unit configured to manage an operation of the active dosing device and of the weighing device as a function of a type of the coffee beans and/or of the coffee beverage.

9. The system according to claim 1 further comprising a control unit configured to manage an operation of the active dosing device as a function of a type of the coffee beans and/or of the coffee beverage.

10. The system according to claim 9, wherein the control unit further comprises a torque sensor exerted by the active dosing device.

11. The system according to claim 1 further comprising a grinder receiving the coffee beans dispensed by the system and converting the coffee beans into roast and ground coffee.

12. A system for dispensing a certain quantity of coffee beans into a beverage preparation machine to prepare a coffee beverage, the system comprising an airtight variable volume container with an inner volume configured to store the coffee beans, the inner volume being configured to adapt to a quantity of the coffee beans stored in the airtight variable volume container; and the system further comprising an active dosing device configured to act as a pump and as a reverse pump to convey the coffee beans out of or into the inner volume, respectively, the active dosing device being airtight to an outside environment also while conveying the coffee beans, the active dosing device comprising two counter-rotating cylinders tightly contacting each other while delivering the coffee beans such that air tightness in the inner volume is maintained, the active dosing device configured to rotate towards an inner center of the counter-rotating cylinders so that the active dosing device acts as a pump to convey the coffee beans out of the inner volume; and the active dosing device configured to rotate towards outside of the inner center of the counter-rotating cylinders so that the active dosing device acts as the reverse pump to convey the coffee beans into the inner volume;

wherein the variable volume container comprises a piston element displacing by gravity to adapt the inner volume of the airtight variable volume container to the quantity of the coffee beans stored in the inner volume; and wherein the piston element further comprises a pressure valve with a threshold pressure equivalent to the weight of the piston element.

* * * * *